(12) United States Patent
Chen

(10) Patent No.: US 9,139,228 B2
(45) Date of Patent: Sep. 22, 2015

(54) MODULAR ELECTRIC SCOOTER FRAME STRUCTURE

(71) Applicant: KUIANDA Company Limited, Kaohsiung (TW)

(72) Inventor: Mao-Chiang Chen, Kaohsiung (TW)

(73) Assignee: KUIANDA COMPANY LIMITED, Kaohsiung (TW)

( * ) Notice: Subject to any disclaimer, the term of this patent is extended or adjusted under 35 U.S.C. 154(b) by 0 days.

(21) Appl. No.: 14/166,705

(22) Filed: Jan. 28, 2014

(65) Prior Publication Data
US 2015/0061273 A1    Mar. 5, 2015

(30) Foreign Application Priority Data
Sep. 5, 2013    (TW) .............................. 102216686 U

(51) Int. Cl.
| | |
|---|---|
| B62K 7/02 | (2006.01) |
| B62D 21/12 | (2006.01) |
| B62K 19/26 | (2006.01) |
| B62K 5/003 | (2013.01) |
| B62K 19/02 | (2006.01) |
| B62K 19/18 | (2006.01) |
| B62K 15/00 | (2006.01) |

(52) U.S. Cl.
CPC ................ *B62D 21/12* (2013.01); *B62K 5/003* (2013.01); *B62K 7/02* (2013.01); *B62K 19/02* (2013.01); *B62K 19/18* (2013.01); *B62K 19/26* (2013.01); *B62K 2015/001* (2013.01)

(58) Field of Classification Search
CPC .... B62K 7/02; B62K 2015/001; B62K 19/02; B62K 19/18; B62K 19/26; B62K 5/003
USPC .......................................... 280/785; 180/208
See application file for complete search history.

(56) References Cited

U.S. PATENT DOCUMENTS

| | | | | |
|---|---|---|---|---|
| 2,107,382 | A * | 2/1938 | Maddock | 280/796 |
| 2,173,525 | A * | 9/1939 | Wallace | 280/796 |
| 5,725,247 | A * | 3/1998 | Nilsson et al. | 280/781 |
| 5,941,327 | A * | 8/1999 | Wu | 180/65.1 |
| 6,170,592 | B1 * | 1/2001 | Wu | 180/208 |
| 6,193,274 | B1 * | 2/2001 | Brown et al. | 280/784 |
| 6,439,331 | B1 * | 8/2002 | Fan | 180/208 |

(Continued)

FOREIGN PATENT DOCUMENTS

| | | | | |
|---|---|---|---|---|
| EP | 0825098 A2 * | 2/1998 | | B62K 25/04 |
| GB | 226927 A * | 1/1925 | | B62K 19/26 |

(Continued)

*Primary Examiner* — Nicole Verley
(74) *Attorney, Agent, or Firm* — Muncy, Geissler, Olds & Lowe, P.C.

(57) ABSTRACT

A modular electric scooter frame structure comprises a front frame, a rear frame and a plurality of pivotal elements. The front frame includes at least one first transverse bar and a plurality of front side bars each includes a plurality of first through holes on a lateral side and a female pivot portion at one end. The rear frame includes at least one second transverse bar and a plurality of rear side bars each includes a plurality of second through holes on a lateral side and a male pivot portion at one end. The first and second transverse bars respectively have two struts to wedge in the first and second through holes for fastening. Each pivotal element runs through a first pivotal hole of the female pivot portion and a second pivotal hole of the male pivot portion to fasten the front and rear frames together.

8 Claims, 7 Drawing Sheets

(56) References Cited

U.S. PATENT DOCUMENTS

| | | | |
|---|---|---|---|
| 6,565,105 B2 * | 5/2003 | Lin | 280/124.113 |
| 6,655,717 B1 * | 12/2003 | Wang | 280/781 |
| 6,851,498 B1 * | 2/2005 | Sauve | 180/208 |
| 7,028,799 B2 * | 4/2006 | Lin | 180/208 |
| 7,044,249 B2 * | 5/2006 | Fan | 180/208 |
| 7,325,866 B2 * | 2/2008 | Horton et al. | 296/205 |
| 7,832,746 B2 * | 11/2010 | Peterson | 280/87.05 |
| 7,841,610 B2 * | 11/2010 | Wang | 280/208 |
| 7,896,428 B2 * | 3/2011 | Tamakoshi et al. | 296/187.03 |
| 7,926,606 B2 * | 4/2011 | Wang | 180/208 |
| 7,967,095 B2 * | 6/2011 | Kosco et al. | 180/208 |
| 8,388,006 B2 * | 3/2013 | Wu et al. | 280/287 |
| 8,857,853 B2 * | 10/2014 | Lin | 280/785 |
| 2003/0218373 A1 * | 11/2003 | Etzioni et al. | 297/411.3 |
| 2006/0086553 A1 * | 4/2006 | Chen | 180/208 |
| 2006/0181059 A1 * | 8/2006 | Chen | 280/504 |
| 2012/0318595 A1 * | 12/2012 | Belenkov et al. | 180/205.1 |
| 2013/0093161 A1 * | 4/2013 | Savsek et al. | 280/287 |
| 2013/0206496 A1 * | 8/2013 | Hashimoto | 180/291 |

FOREIGN PATENT DOCUMENTS

| | | | |
|---|---|---|---|
| TW | M276772 U | 10/2005 | |
| WO | WO 9639322 A1 * | 12/1996 | B62D 27/02 |

* cited by examiner

MODULAR ELECTRIC SCOOTER FRAME STRUCTURE

FIELD OF THE INVENTION

The present invention relates to a modular electric scooter frame structure and particularly to a modular electric scooter frame structure that can be easily assembled and disassembled to facilitate transportation, reduce inventory and save storage space.

BACKGROUND OF THE INVENTION

In view of the disadvantages of the traditional fixed frames of scooters that are heavy and bulky and take a lot of space, an assembly type electric scooter frame that combines a front frame with and a rear frame has been developed in the industry to comply with regulation of different countries and meet consumers' diversified requirements.

Please referring to FIG. 1, a conventional electric scooter frame 1 includes a front frame 11 and a rear frame 12 that are both made by welding tubes with rectangular cross section together. It also has a plurality of front wheels 13 installed on the front frame 11, a plurality of rear wheels 14 installed on the rear frame 12, a battery set 15 and a transmission means 16 to drive the rear wheels 14. The rear frame 12 has a support tube 17 extending upward to hold a seat 18. The front frame 11 is coupled with an operation handlebar 19 extending upwards at the front side to turn the front wheels 13. The front frame 11 and the rear frame 12 further are covered by a housing. Due to difference of physical size and built between eastern and western people, the specifications and regulations of the scooter also are different in different countries, such as length limitation. Hence producers have to make the scooters at different lengths to meet the requirements of different countries.

Applicant also provides an improved assembling frame (disclosed in Taiwan utility patent No. M276772 entitled "Walking assisted scooter frame structure") as shown in FIG. 2. It includes mainly a scooter frame 2 coupled with a handler frame 23 a front end thereof. The scooter frame 2 includes a rear frame 22 at a rear end thereof to hold a drive mechanism and a front end. The front frame 21 includes two longitudinal support bars 211 extending respectively forward from two sides of the front end to form two fastening portions 212 with a plurality of apertures 213 formed on the fastening portions 212, and a coupling bar 214 extending forward from the middle of the front end. The handler frame 23 includes a transverse support bar 24 with two fastening plates 241 fastened at two ends thereof. The two fastening portions 212 of the front frame 21 are mounted onto the two fastening plates 241 through screw elements 231 to fasten the front frame 21 and the handler frame 23 together.

However, in practice the aforesaid electric scooter frame still has problems yet to be resolved, notably:

a. The frame requires dedicated fixtures for the welding process. The welding process is complicated and time-consuming. Hence production efficiency is lower.

b. It needs a greater number of components and its total weight is higher. Also, the frame generally is made by welding of metal material. The welding joints of the frame often have inconsistent strength characteristics that could result in deficient reliability.

c. Greater dimension variances. Since the frame is assembled by welding, misalignment and welding deformation could easily take place that often result in errors. As a result, dimension variances of conventional electric scooter frame are greater. When the errors exceed an allowable range, the finished welding portions have to be dismantled and the welding has to be redone. This not only wastes a lot of working time, production efficiency also suffers.

From the perspective of the producers, by fabricating a common bar frame for electric scooters and preparing other smaller accessories such as transverse bars, they can be mated for assembly to provide a wide variety of products. Not only product transportation is easier, transportation cost also is lower. It also can greatly reduce inventory and save storage space, thus provide even more benefits.

SUMMARY OF THE INVENTION

The primary object of the present invention is to overcome the disadvantages of the conventional scooter frames and provide an improved assembly type electric scooter frame that can be simply assembled and disassembled to facilitate transportation, reduce inventory and save storage space.

To achieve the foregoing object a modular electric scooter frame structure is provided by the invention. The modular electric scooter frame structure includes a front frame, a rear frame and a plurality of pivotal elements. The front frame includes at least one first transverse bar and a plurality of front side bars which are arranged in parallel and spaced from each other. Each front side bar includes a female pivot portion at one end thereof and a plurality of first through holes on lateral side thereof. The first transverse bar includes two struts at two ends thereof to wedge in the first through holes respectively and to be fastened by a plurality of fastening elements. The rear frame includes at least one second transverse bar and a plurality of rear side bars which are arranged in parallel and spaced from each other. Each rear side bar includes a male pivot portion at one end thereof and a plurality of second through holes on lateral side thereof. The second transverse bar includes two struts at two ends thereof to be wedged in the second through holes respectively and to be fastened by the plurality of fastening elements. Each of the plurality of pivotal elements runs through a first pivotal hole of the female pivot portion of the front side bar and a second pivotal hole of the male pivot portion of the rear side bar to fasten them together.

In short, by means of the frame structure set forth above, the invention provides many advantages. Since the front side bars, the rear side bars and the first and second transverse bars can be made by forging of aluminum alloy, they can be modularized for easily assembly, therefore many benefits can be realized, such as reduce production cost, improve transportation, reduce inventory and save storage space.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
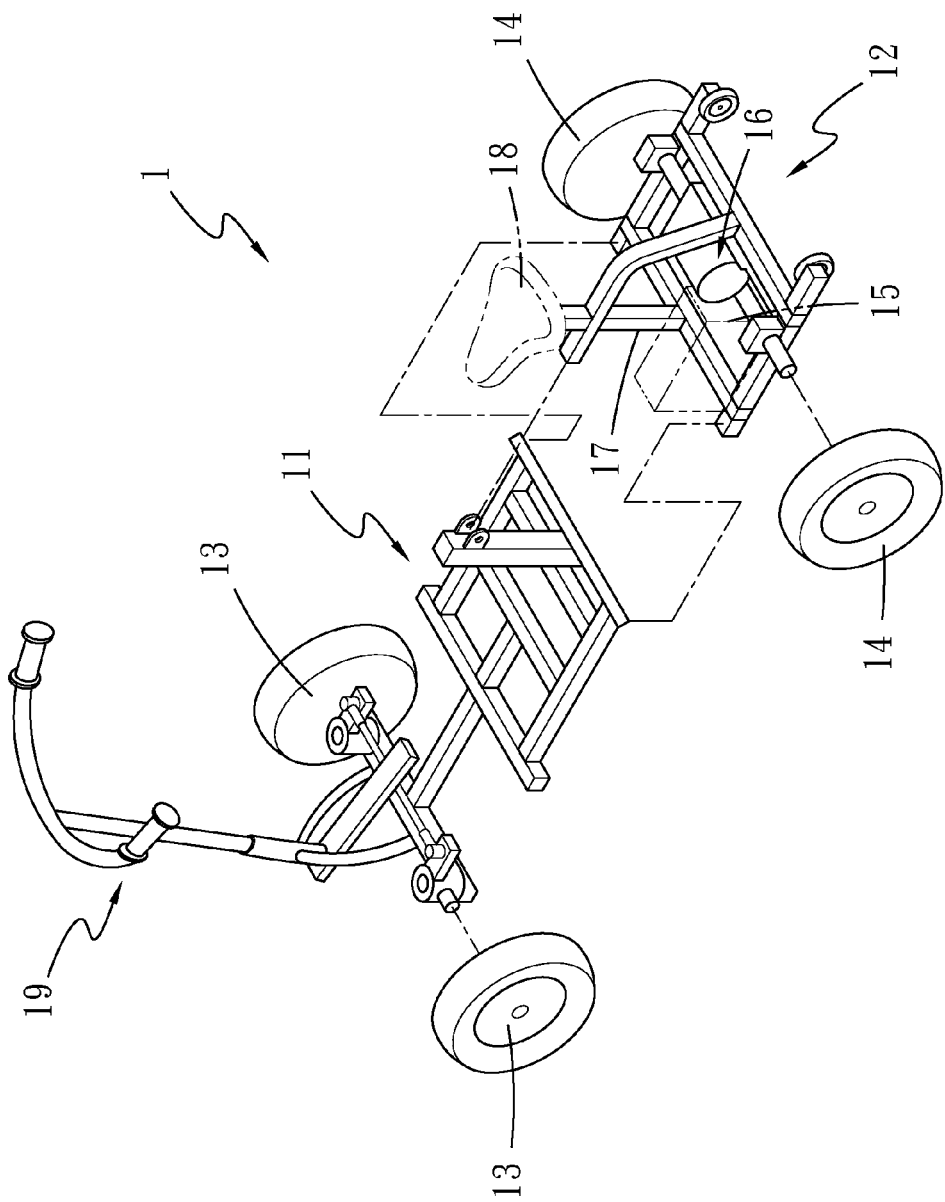
FIG. 1 is an exploded view of a conventional electric scooter frame.
Figure 2:
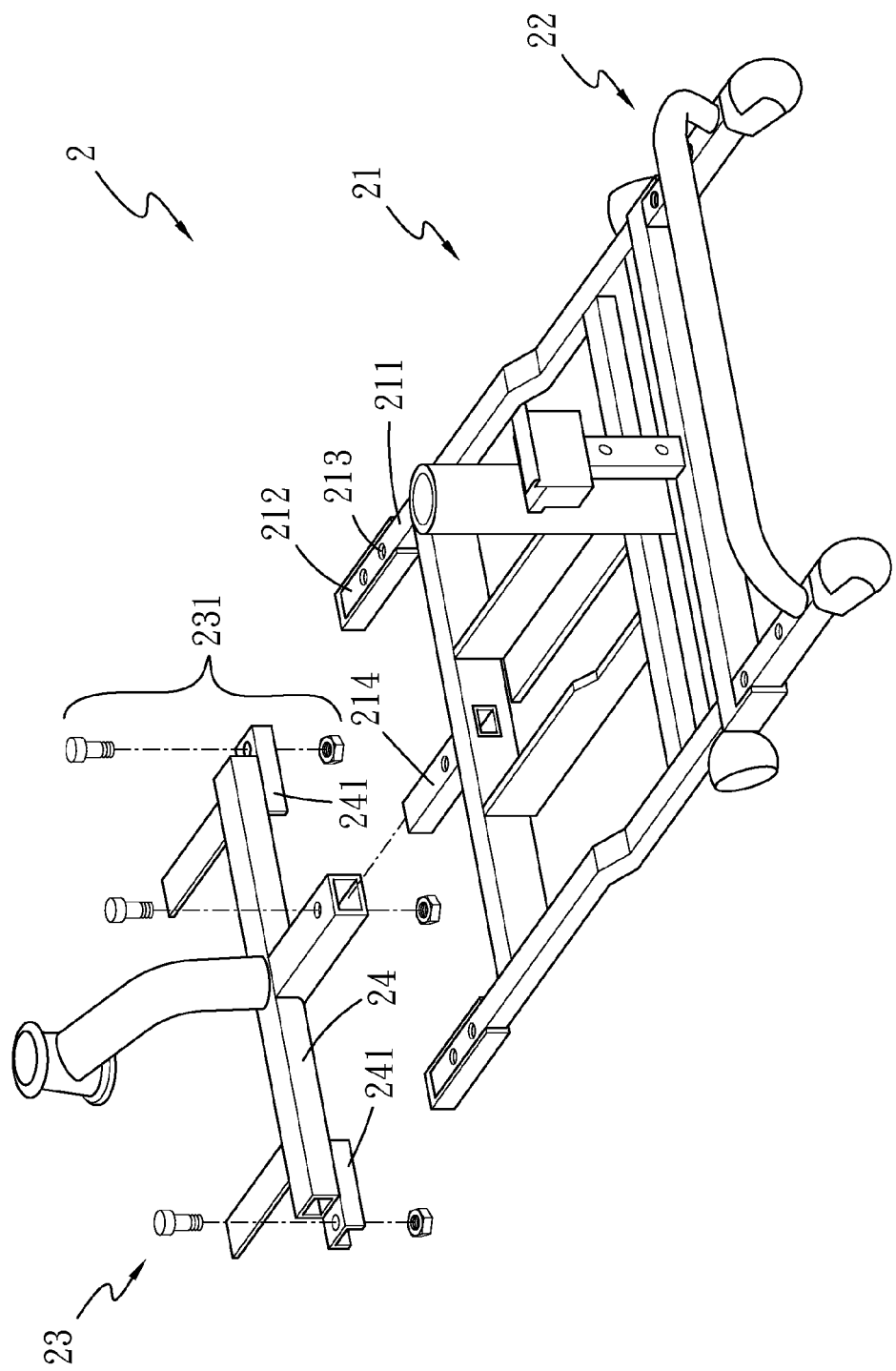
FIG. 2 is an exploded view of a conventional assembling electric scooter frame.
Figure 3:
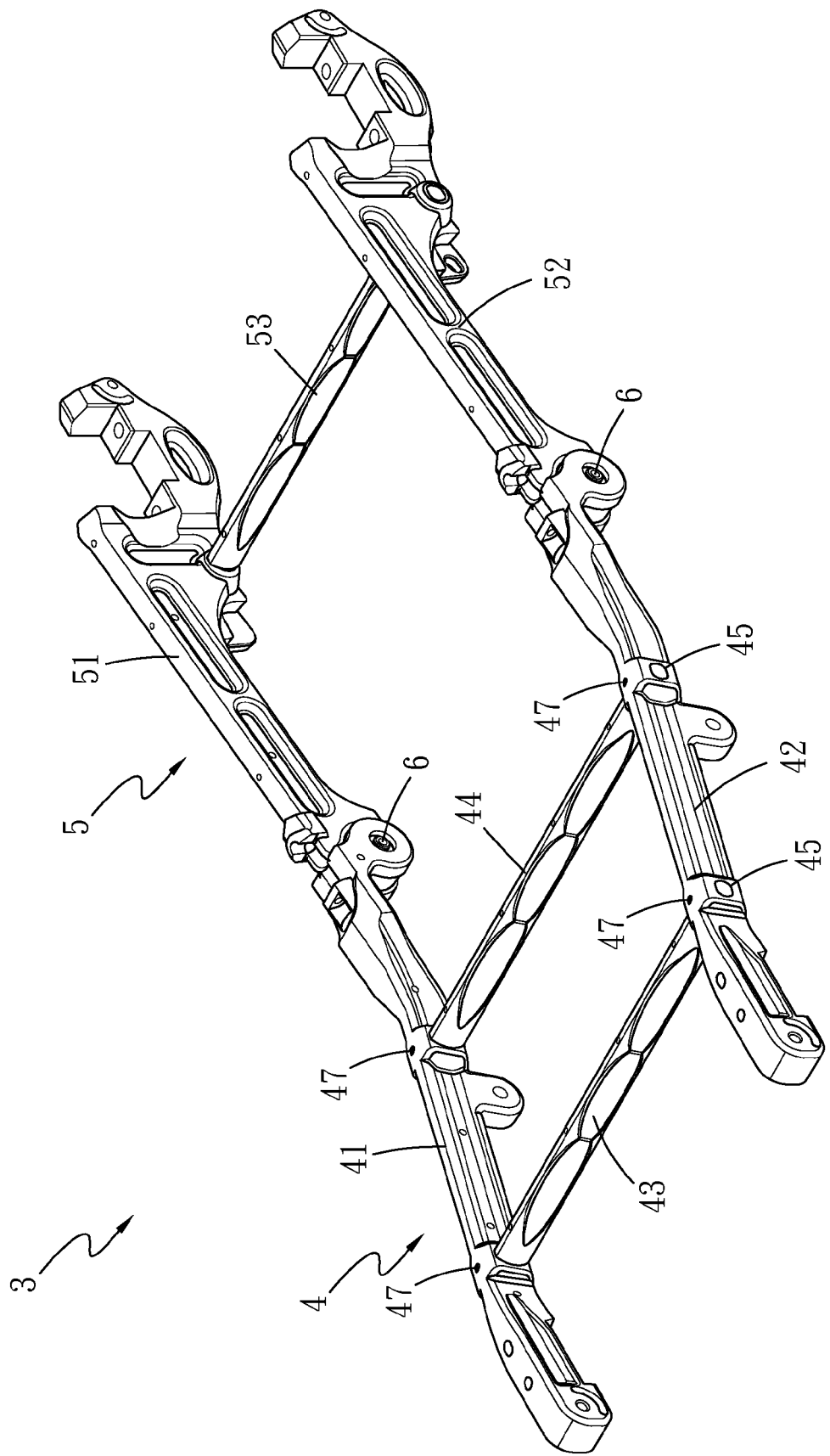
FIG. 3 is a perspective view of the invention.

Please referring to FIGS. 3 through 6, the present invention aims to provide a modular electric scooter frame structure that includes a front frame 4, a rear frame 5 and a plurality of pivotal elements 6.

The front frame 4 includes at least one first transverse bar and a plurality of front side bars 41 and 42 that can be made of aluminum alloy through various fabrication processes such as casting, mold forging, impact extrusion, CNC precision machining or the like. In this embodiment, the front frame 4 includes two first transverse bars 43 and 44. In practice, each of the front side bars 41 and 42 includes a female pivot portion 48 at one end thereof and a plurality of first through holes 45 on lateral side thereof. The two first transverse bars 43 and 44 include two struts 431 and 441 at two ends thereof respectively to wedge in the first through holes 45 of the front side bars 41 and 42 respectively, and a fastening element 47 is provided at the junction of the strut 431 and the first through hole 45 to fasten the first transverse bars 43 and 45 and the front side bars 41 and 42 together.

The rear frame 5 includes at least one second transverse bar 53 and a plurality of rear side bars 51 and 52 that also can be made of aluminum alloy through various fabrication processes such as casting, mold forging, impact extrusion, CNC precision machining or the like. In practice, each of the rear side bars 51 and 52 includes a male pivot portion 54 at one end thereof and a plurality of second through holes 55 on lateral side thereof. The second transverse bar 53 includes two struts 531 at two ends thereof to wedge in the second through holes 55 of the rear side bars 51 and 52 respectively, and a fastening element 57 is provided at the junction of the strut 531 and the second through holes 55 for fastening the second transverse bar 53 and the rear side bars 51 and 52 together. Each of the plurality of pivotal elements 6 runs through a first pivotal hole 481 of the female pivot portion 48 and a second pivotal hole 541 of the male pivot portion 54, thus the front frame 4 and the rear frame 5 are fastened together.

The front side bars 41 and 42 of the front frame 4 and the rear side bars 51 and 52 of the rear frame 5 are made of aluminum alloy which has lighter weight and excellent rigidity. Because the front frame 4 and the rear frame 5 occupy a greater portion of the total frame, the total modular scooter frame structure of the invention also has characteristics of lighter weight and excellent rigidity.

Figure 4:
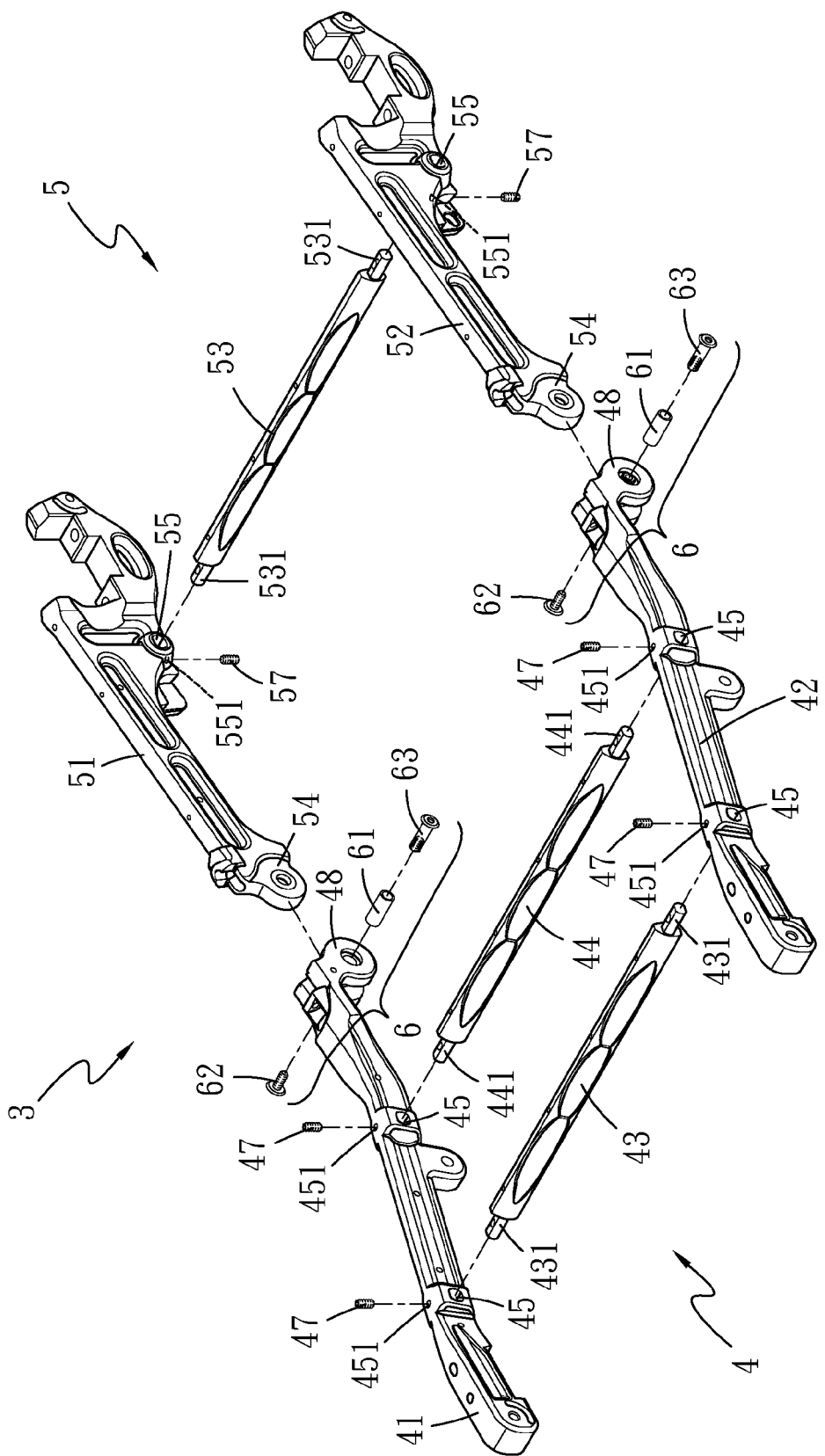
FIG. 4 is an exploded view of the invention.

Please referring to FIG. 4, the front side bars 41 and 42, and the rear side bars 51 and 52 can be implemented respectively by same element in practice, and the first and second transverse bars 43, 44 and 53 also can be implemented by the same element. Since those bars of the modular electric scooter frame structure of the invention are common, productivity can be boosted and production costs can be shared and reduced, therefore capital investment in production also is lower. As a result, many other benefits also can be achieved, such as easier transportation, reduce inventory and save storage space. All this makes total cost lower.

Figure 5:
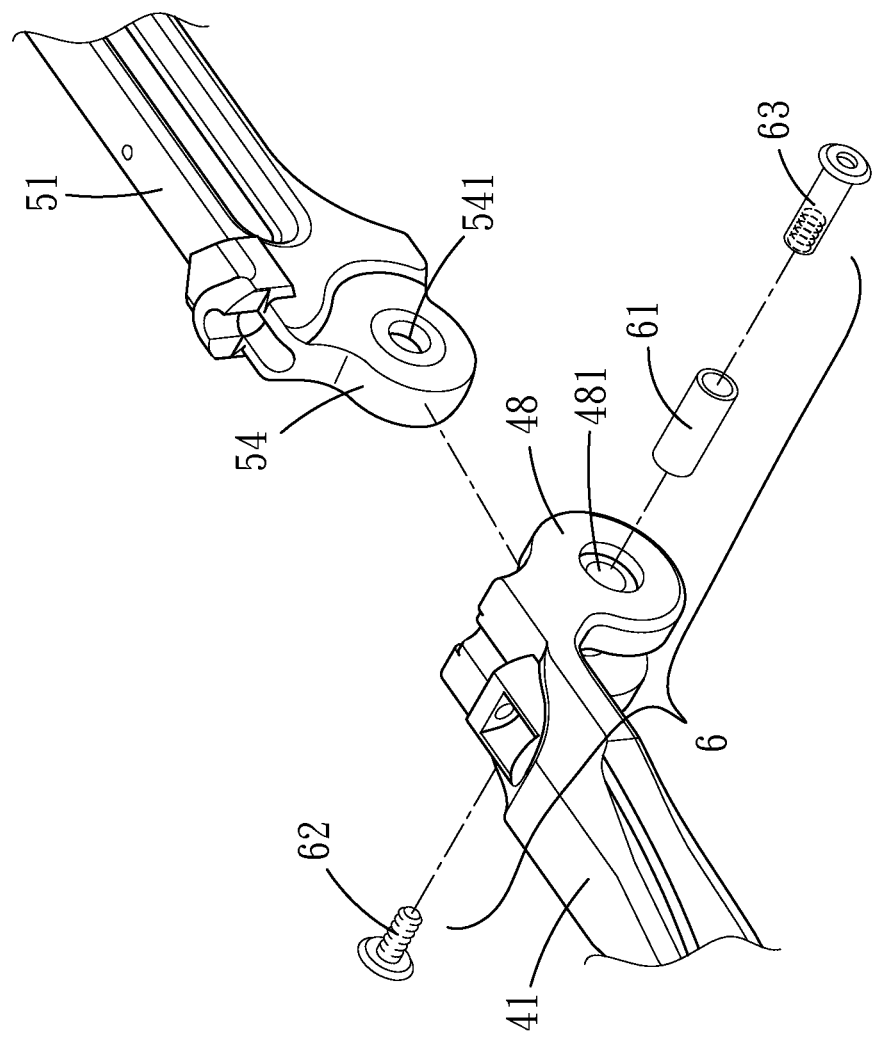
FIG. 5 is a fragmentary exploded view of a front and a rear side bars of the invention.

Please also referring to FIG. 5, the front side bar 41 and the rear side bar 51 are taken as an example for discussion of assembling the front frame 4 and the rear frame 5. First, the female pivot portion 48 of the front side bar 41 and the male pivot portion 54 of the rear side bar 51 are coupled together. Then, one pivotal element 6 which includes a sleeve 61, a screw 62 and a nut 63 is provided to fasten the female pivot portion 48 and the male pivot portion 54 together. More specifically, the sleeve 61 is penetrated through the first pivotal hole 481 of the female pivot portion 48 and the second pivotal hole 541 of the male pivot portion 54, and then the screw 62 is penetrated through the sleeve 61 to fasten to the nut 63 by screwing.

Figure 6:
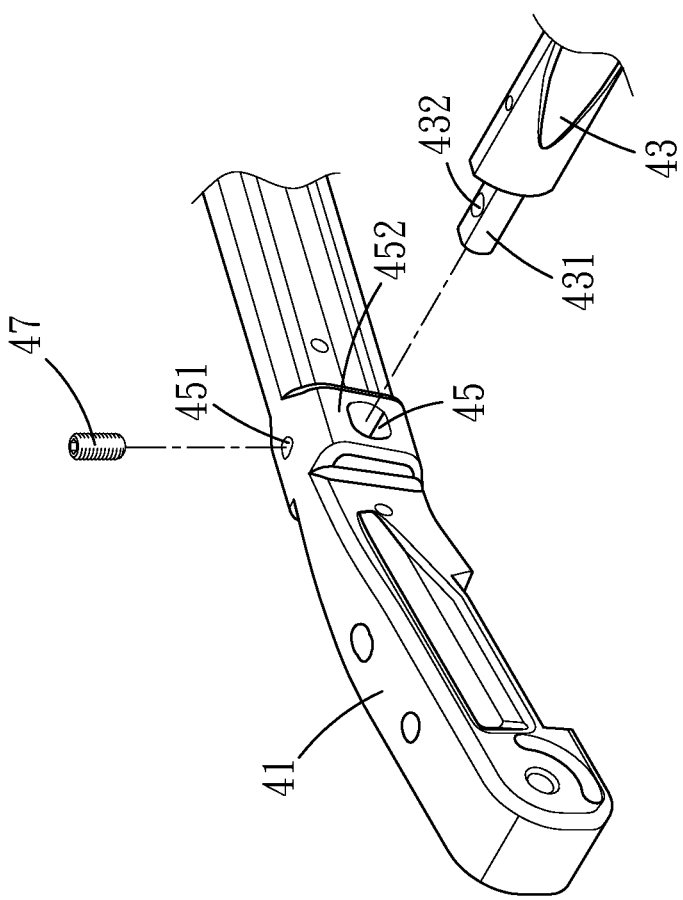
FIG. 6 is a fragmentary exploded view of the front side bar and a transverse bar of the invention.

Also referring to FIGS. 4 and 6, take the first transverse bar 43 and the front side bar 41 to illustrate how to assemble the first and second transverse bars 43, 44 or 53 with the front side bars 41 and 42 or the rear side bars 51 and 52 respectively. The strut 431 can be inserted into the first through hole 45 and fastened by the fastening element 47 such as a screw bolt or a pin. The strut 431 is axially extended outward from the first transverse bar 43 and includes an indent coupling trough 432 formed thereon. The first through hole 45 of the front side bars 41 and 42 includes a first hole 451 formed therein and communicated therewith in a perpendicular manner and a reinforced portion 452 (similarly, the second through hole 55 of the rear side bars 51 and 52 also has a second hole 551 formed therein and communicated therewith in a perpendicular manner). The first hole 451 can be perpendicular to the strut 431. Thus, the first transverse bar 43 can be inserted into the first through hole 45, and the fastening element 47 can run through the first hole 451 and the indent coupling trough 432 to fasten the first transverse bar 43 and the front side bar 41 together.

It is to be noted that the first and second transverse bars 43, 44 and 53 can all be made of aluminum alloy. The first and second transverse bars 43, 44 and 53 are preferably formed with a square cross section.

Figure 7:
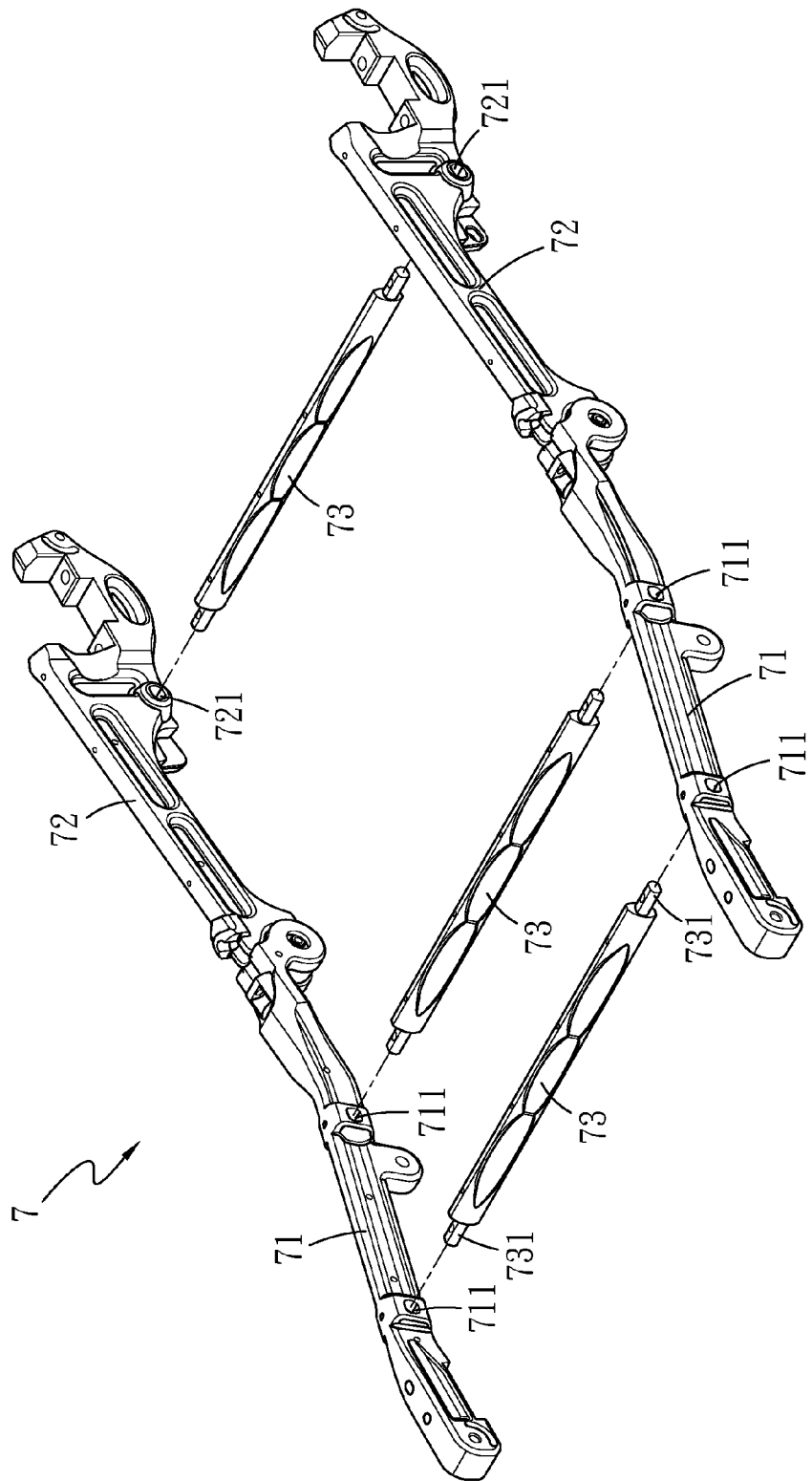
FIG. 7 is an exploded view of another embodiment of the invention.

Please refer to FIG. 7 for another embodiment of the modular electric scooter frame structure of the invention. It includes a scooter frame 7 comprising a plurality of front side bars 71, a plurality of rear side bars 72 and a plurality of transverse bars 73. Each of the plurality of front side bars 71 includes a plurality of third through holes 711 formed on the lateral side thereof. Each of the plurality of rear side bars 72 includes a plurality of fourth through holes 721 formed on the lateral side thereof. Each of the plurality of transverse bars 72 includes two struts 731 at two ends thereof. In practice, the two struts 731 can be inserted into the third through hole 711 and the fourth through hole 721 respectively for fastening. The transverse bars 73 are perpendicular to the front side bars 71 and the rear side bars 72, while the front side bar 71 and the rear side bar 72 at one side of the scooter frame are parallel to another front side bar 71 and another rear side bar 72 at another side of the scooter frame 7. The front side bars 71, the rear side bars 72 and the transverse bars 73 also can be made of aluminum alloy through various fabrication processes such as casting, mold forging, impact extrusion, CNC precision machining or the like.

As a conclusion, the invention mainly provides an improved modular electric scooter frame structure to facilitate production and downstream processes such as transportation and storage, and can provide other advantages such as simpler assembly and disassembly, easier transportation, lower inventory, and saving storage space.

What is claimed is:

1. A modular electric scooter frame structure, comprising:
   a front frame including at least one first transverse bar and a plurality of front side bars which are arranged in parallel and spaced from each other, each of the plurality of front side bars including a female pivot portion at one end thereof and a plurality of first through holes on a lateral side thereof, the first transverse bar including two struts at two ends thereof to wedge in the first through holes respectively and to be fastened by a plurality of fastening elements;

a rear frame including at least one second transverse bar and a plurality of rear side bars which are arranged in parallel and spaced from each other, each of the plurality of rear side bars including a male pivot portion at one end thereof and a plurality of second through holes on a lateral side thereof, the second transverse bar including two struts at two ends thereof to wedge in the second through holes respectively and to be fastened by the plurality of fastening elements; and a plurality of pivotal elements each running through a first pivotal hole of the female pivot portion of the front side bar and a second pivotal hole of the male pivot portion to fasten the front frame and the rear frame together.

2. The modular electric scooter frame structure of claim 1, wherein the first transverse bar, the second transverse bar, the front side bars and the rear side bars are made by forging.

3. The modular electric scooter frame structure of claim 1, wherein the first transverse bar, the second transverse bar, the front side bars and the rear side bars are made of aluminum alloy.

4. The modular electric scooter frame structure of claim 1, wherein the first transverse bar and the second transverse bar bridge respectively the front side bars and the rear side bars.

5. The modular electric scooter frame structure of claim 1, wherein each front side bar includes at least one first hole, each rear side bar including at least one second hole, the first hole and the second hole being run through by the fastening elements to fasten the first transverse bar and the second transverse bar respectively to the front side bar and the rear side bar.

6. A modular electric scooter frame structure, comprising:
a plurality of front side bars each including a plurality of third through holes on a lateral side thereof;
a plurality of rear side bars each including a plurality of fourth through holes on a lateral side thereof; and
a plurality of transverse bars each including two struts at two ends thereof to wedge in the third through holes or the fourth through holes for fastening.

7. The modular electric scooter frame structure of claim 6, wherein the front side bar and the rear side bar at one side are parallel with another front side bar and another rear side bar at another side.

8. The modular electric scooter frame structure of claim 6, wherein the front side bar and the rear side bar are perpendicular to the transverse bars.

* * * * *